Patented Oct. 3, 1950

2,524,601

UNITED STATES PATENT OFFICE 2,524,601

ALUMINA INSULATING MATERIAL AND METHOD OF MAKING THE SAME

Frank H. Riddle, Detroit, Mich., assignor to Champion Spark Plug Company, Toledo, Ohio, a corporation of Delaware No Drawing. Application June 14, 1946, Serial No. 676,859

5 Claims. (Cl. 106—65)

This application is a continuation in part of my prior application Serial No. 334,987, filed May 13, 1940, which in turn was a continuation in part of my prior application Serial No. 195,108, filed March 10, 1938, both now abandoned.

This invention relates to an alumina insulating material and method of making the same.

The invention has for its object to produce a ceramic spark plug insulator consisting chiefly of alumina combined with other materials which make it possible to fire the body at temperatures readily available in commercial ceramic kilns, while retaining substantially the characteristics of an insulator formed from alumina, including high mechanical strength, high heat conductivity, high resistance to heat shock, and high hot dielectric.

An insulating material consisting essentially of alumina fused or sintered into a dense mass has a number of characteristics making it suitable for electric insulating purposes where high heat is encountered together with other conditions such as are present in the use of spark plugs. However, the temperature required for binding or sintering substantially pure alumina is too great for ready application in usual ceramic furnaces, and the application of such high heat necessarily increases the cost of production so as to make it prohibitive for general purposes for which lower fired bodies are available. The firing temperature of the alumina body can be readily reduced to a marked extent by the introduction of suitable compounds. For some purposes, a body chiefly of alumina but with additions which produce a lower melting bond may be satisfactory, but the usual additions cannot be made in sufficient quantities to bring the firing temperature below cone 20 without impairing some of the desirable qualities of the insulating material.

I have found that the firing temperature of a substantially alumina body can be materially lowered by the addition of mullite, or an anhydrous aluminum silicate which is readily transformed into mullite upon firing, such as andalusite, sillimanite, cyanite, or dumortierite. When the firing temperature is lowered by such additions, under such conditions that no material amount of mullite crystals are present in the fired body, the desirable qualities are maintained or increased. This is especially true of the hot dielectric quality, when commercial alumina is employed with even small traces of sodium as an impurity.

Furthermore, it is found that these good qualities are maintained even when further additions of suitably selected compounds are made, which still further lower the firing temperature. In fact, when mullite materials are added in the manner mentioned, other properly chosen materials which lower the temperature and which would impair the qualities in the absence of mullite may be added and have their full effect in lowering the firing temperature, without detracting from the finished product.

An appreciable effect upon the firing temperature results from 5% of anhydrous aluminum silicate in the batch, and increasing effects result from somewhat greater amounts. It is preferred to add from 10% to 15% with proper fluxes, though greater amounts may be added under proper conditions.

The anhydrous aluminum silicate may consist of mullite which has been prepared by firing a suitable material for a sufficient time and at a sufficient temperature to substantially complete its transformation into mullite, or anhydrous materials may be employed which transform into mullite at or below the temperatures to which the completed body is to be fired. Where any of these anhydrous minerals are employed, they are usually found with natural impurities, and unless too excessive these natural impurities aid in lowering the firing temperature while they do not seriously affect the desirable qualities of the finished product.

It has been found that the heat conductivity of the fired body is deleteriously affected when mullite materials and/or silica are introduced into an alumina body in such proportions and fired under such conditions that an appreciable amount of mullite crystals can be detected in the fired body.

Where there are no other mineralizing or fluxing materials added either separately or as impurities in the alumina or mullite materials, a small amount of aluminum silicate or silica will result in about an equal, or sometimes greater, amount of mullite in the body when it is fired to maturity. The addition of alkaline earth fluxes decreases the tendency to form mullite crystals in the fired body. Compounds of beryllium have the least inhibiting effect of this group of compounds, while compounds of magnesium are more effective, and compounds of calcium, strontium and barium are still more effective.

Where anhydrous aluminum silicate or silica are added in an amount to introduce about 15% of silica into the batch, without alkaline earth fluxes, firing results in from 20% to upwards of 40% mullite crystals in the finished body, depending upon various factors. For example, slow firing, or long continued heating at approximately the maturing temperature, results in a maximum amount of mullite crystals in the body just described, while an inhibiting amount of an alkaline earth flux eliminates mullite crystals more effectively when slow, or long continued firing is employed.

Therefore, the paradoxical situation arises that without a mullite-inhibiting flux, slow or long continued firing increases the mullite in the fired body, while with the inhibitor slow or long continued firing reduces or eliminates the mullite.

When about 15% silica is introduced into the batch, either as silica or in anhydrous aluminum silicate, 6% oxide of calcium, strontium or barium entirely inhibits the crystallization of mullite, while under the same firing conditions 6% oxide of magnesium permitted the crystallization of 3% to 5% mullite and 6% oxide of beryllium permitted the crystallization of 25% to 30% mullite. Greater amounts of compounds of magnesium or beryllium are effective to inhibit crystallization of mullite.

While, as indicated, mullite crystallization may be inhibited in an alumina body with silica present in an amount in excess of 15%, such large amounts of mullite materials or silica are not found to be as satisfactory as less amounts.

A very satisfactory body has been produced from a mixture such as follows:

| | |
|---|---|
| $Al_2O_3$ | 80.75 |
| Brucite | 8. |
| $CaCO_3$ | 2. |
| Zircon | 2. |
| Beryl | 2.25 |
| Dumortierite | 5. |

The $CaCO_3$ may be added as whiting, the zircon, beryl and dumortierite as minerals with natural impurities, provided these impurities are not excessive or do not contain sodium compounds or other deleterious ingredients.

These ingredients are ground in a ball mill with both lining and balls formed of mullite and glass, whereby there is added to the batch from the material of the lining and balls about 3% silica, 2% alumina, and a small amount of fluxing ingredients.

The mineralizers or fluxes mentioned in the above formula, have been found to constitute an effective combination, especially when employed with substantially pure alumina, but this combination of mineralizers is not claimed per se in this application. Where dumortierite or other anhydrous aluminum silicates are employed, any of the alkaline earth compounds or combinations of them may be employed in sufficient quantity to inhibit crystallization of mullite and at the same time lower the firing temperature sufficiently for maturing the bodies in commercially available kilns without injuring the good qualities of the substantially pure alumina bodies.

The alkaline earth compounds found to be suitable, and referred to above, are the oxygen compounds of the alkaline earth metals, either the oxides or such compounds as the carbonates, which may be considered a combination of the alkaline earth and $CO_2$, the hydroxides, which are combinations of the earths and water, or silicates, which are compounds of the earths and $SiO_2$. For brevity, this class of compounds may be called compounds containing the oxide of an alkaline earth metal. Fluorides of alkaline earth metals, and similar halogen compounds, are not satisfactory for the desired purpose, and of course are not compounds containing an oxide of an alkaline earth metal.

The dumortierite employed in the above example consisted of about 76% dumortierite, 13% muscovite mica, 9% quartz, and the remaining 2% of titanium oxide and other minor impurities.

It will be readily understood that the dumortierite may be reduced below 5% or increased up to 25%, although 5% to 15% is considered preferable, especially where ground in a mullite mill. Also, as indicated above, either previously prepared mullite, or other anhydrous aluminum silicates which will form mullite at the temperature to which the body is fired, may be substituted for the dumortierite. The mixture specifically disclosed above has been satisfactorily fired at a temperature of about cone 16 or 17 (1450° C. to 1465° C.). Of course, the degree of grinding and method of preparation affect the firing temperature, as is well known.

Another specific example of the present invention which has proved to be very satisfactory, contains the following ingredients:

84% alumina
10% andalusite—anhydrous aluminum silicate
6% MgO—alkaline earth oxide compound A body containing these ingredients was fired at 1510° C. for 7 hours including a two-hour soak period. No mullite crystals were detected in the final product.

While titanium oxide was not mentioned in the list of mineralizers given above, it is present as an ingredient in much of the commercially available anhydrous aluminum silicate minerals, and as generally so found is unobjectionable. Titanium compounds aid in reducing the firing temperature, but have a tendency to make the product more brittle.

Good results may be obtained with pre-formed mullite, but the reactions resulting in the final product take place more readily where the anhydrous aluminum silicates are minerals that might form mullite, so that the minerals are preferable, and of these dumortierite is the most desirable. These materials may be used to good advantage within a range from 5% to 25%, but 10% to 15% is preferred in the batch when ready for firing. The total amount of mineralizers may be varied in accordance with the number and kind of substances used, the purity and condition of the alumina, the quantity and kind of the anhydrous aluminum silicate and the temperature which is available for firing the body, but usually from 2% to 10% is advantageous, and about 6% is preferred. As indicated, compounds of calcium, strontium and barium have the maximum inhibiting effect on the growth of mullite crystals, but with the proportions of anhydrous aluminum silicate preferred, the maximum inhibiting effect is not necessary.

Andalusite also is a very desirable mineral. If cyanite is used in any great amount, it is generally preferable to subject it to pre-treatment to avoid excessive volume changes during firing, and of course any of these minerals may be pre-treated to reduce impurities that are excessive or harmful.

While silica may be used as such, it is preferable to introduce it in the form of anhydrous aluminum silicate.

When made in accordance with the foregoing disclosure, the fired body comprises crystallized alumina bonded by silica-alkaline earth glass, in the preferred body the glass amounting to between 10% and 25% of the total, and the body being substantially free from mullite crystals.

What I claim is:

1. The method of making an electric insulator which consists in firing to vitrification a ceramic body consisting of about 84% alumina crystals, about 10% anhydrous aluminum silicate, and about 6% mineralizers consisting essentially of alkaline earth metal oxide, and continuing the firing until there are no mullite crystals detectable in the fired body but not sufficient to melt the alumina crystals.

2. The method of making a vitrified electric insulator in which finely divided alumina particles are uniformly dispersed in a substantially mullite-free fused matrix, which method consists in firing a ceramix mix consisting essentially of 75% to 90% of finely divided alumina particles, 2% to 10% of an alkaline earth metal oxide, and the remainder aluminum silicate, said firing being carried out at a temperature above the melting point of the matrix materials but below the melting point of the alumina crystals, and being continued for a time sufficient to fuse the matrix materials, said firing temperature and time being such as would transform the aluminum silicate into mullite, the mullite formation being inhibited by the presence of the alkaline earth metal oxide.

3. The method of making a vitrified electric insulator in which finely divided alumina particles are uniformly dispersed in a substantially mullite-free fused matrix, which method consists in firing a ceramic mix consisting essentially of 75% to 90% of finely divided alumina particles, 2% to 10% of an alkaline earth metal oxide introduced as compounds containing oxide of an alkaline earth metal, and the remainder aluminum silicate, said firing being carried out at a temperature above the melting point of the matrix materials but below the melting point of the alumina crystals, and being continued for a time sufficient to fuse the matrix materials, said firing temperature and time being such as would transform the aluminum silicate into mullite, the mullite formation being inhibited by the presence of the alkaline earth metal oxide.

4. The method of making a vitrified electric insulator in which finely divided alumina particles are uniformly dispersed in a substantially mullite-free fused matrix, which method consists in firing a ceramic mix consisting essentially of 75% to 90% of finely divided alumina particles, 2% to 10% of a compound containing an oxide of an alkaline earth metal, and the remainder aluminum silicate, said firing being carried out at a temperature above the melting point of the matrix materials but below the melting point of the alumina crystals, and being continued for a time sufficient to fuse the matrix materials, said firing temperature and time being such as would transform the aluminum silicate into mullite, the mullite formation being inhibited by the presence of the alkaline earth metal oxide.

5. A vitrified electric insulator made in accordance with the method of claim 4.

FRANK H. RIDDLE.

REFERENCES CITED

The following references are of record in the file of this patent:

UNITED STATES PATENTS

| Number | Name | Date |
| --- | --- | --- |
| 2,195,950 | Wood | Apr. 2, 1940 |
| 2,272,618 | Fessler et al. | Feb. 10, 1942 |